US007698410B2

(12) United States Patent
Seth et al.

(10) Patent No.: US 7,698,410 B2
(45) Date of Patent: Apr. 13, 2010

(54) CONTEXT-SENSITIVE, SELF-ADJUSTING TARGETING MODELS

(75) Inventors: Amitabh Seth, Saratoga, CA (US); Shu-Yao Chien, Sunnyvale, CA (US); George John, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 398 days.

(21) Appl. No.: 11/741,301

(22) Filed: Apr. 27, 2007

(65) Prior Publication Data

US 2008/0267207 A1 Oct. 30, 2008

(51) Int. Cl.
*G06F 15/173* (2006.01)
*G06F 9/455* (2006.01)
*G06F 17/00* (2006.01)
*G10L 21/00* (2006.01)
*G01R 31/08* (2006.01)
*G06F 11/30* (2006.01)

(52) U.S. Cl. ......................... 709/223; 703/23; 707/100; 704/273; 370/229; 702/182

(58) Field of Classification Search ......... 709/223–230; 703/23; 705/10; 707/102; 704/273; 370/235; 702/185
See application file for complete search history.

(56) References Cited

U.S. PATENT DOCUMENTS 6,278,966 B1 * 8/2001 Howard et al. ................ 703/23
6,973,459 B1 * 12/2005 Yarmus ...................... 707/102
7,146,416 B1 * 12/2006 Yoo et al. ................... 709/224
7,523,016 B1 * 4/2009 Surdulescu et al. ......... 702/185
2002/0062372 A1 * 5/2002 Hong et al. ................. 709/225
2003/0004781 A1 * 1/2003 Mallon et al. ................. 705/10
2004/0111504 A1 * 6/2004 Halim et al. ................ 709/223
2006/0230167 A1 * 10/2006 Watanabe et al. ........... 709/230
2006/0277047 A1 * 12/2006 DeBusk et al. .............. 704/273
2007/0211635 A1 * 9/2007 Hao et al. ................... 370/235

* cited by examiner

*Primary Examiner*—Joseph E. Avellino
*Assistant Examiner*—Kiet Tang
(74) *Attorney, Agent, or Firm*—Weaver Austin Villeneuve & Sampson LLP

(57) ABSTRACT

In an embodiment, new traffic pattern data is received pertaining to a first time period having a first time increment. The traffic pattern data may be received as, or converted to, count information reflecting the probabilities that the user will select particular links services. An incremental table is accessed to determine stale traffic pattern count data, which is the traffic pattern count data in the incremental table over a second time period having the first time increment, wherein the second time period covers the oldest traffic pattern count data in the incremental table. Then a count table is updated to reflect removal of the stale traffic pattern count data, wherein the count table contains global count data at a higher level of granularity than the incremental table. The incremental table and count table are updated to reflect addition of the new traffic pattern data.

18 Claims, 4 Drawing Sheets

300

| | Count1 | Count2 | Count3 | Count4 |
|---|---|---|---|---|
| Aggregate for User1 | 15 | 12 | 23 | 0 |

304

| | Count1 | Count2 | Count3 | Count4 |
|---|---|---|---|---|
| Aggregate for User1 | 12 | 13 | 23 | 1 |

302

| Date for User 1 | Count1 | Count2 | Count3 | Count4 |
|---|---|---|---|---|
| 4/1/07 | 2 | 1 | 3 | 0 |
| 4/2/07 | 1 | 1 | 3 | 0 |
| 4/3/07 | 0 | 0 | 0 | 0 |
| 4/4/07 | 0 | 0 | 0 | 0 |
| 4/5/07 | 0 | 0 | 0 | 0 |
| 4/6/07 | 3 | 0 | 0 | 0 |
| 4/7/07 | 2 | 3 | 3 | 0 |
| 4/8/07 | 0 | 1 | 0 | 0 |
| 4/9/07 | 0 | 0 | 1 | 0 |
| 4/10/07 | 0 | 0 | 0 | 0 |
| 4/11/07 | 0 | 0 | 0 | 0 |
| 4/12/07 | 0 | 0 | 5 | 0 |
| 4/13/07 | 0 | 0 | 0 | 0 |
| 4/14/07 | 0 | 0 | 0 | 0 |
| 4/15/07 | 0 | 0 | 0 | 0 |
| 4/16/07 | 1 | 2 | 0 | 0 |
| 4/17/07 | 0 | 0 | 0 | 0 |
| 4/18/07 | 0 | 0 | 0 | 0 |
| 4/19/07 | 1 | 1 | 5 | 0 |
| 4/20/07 | 0 | 0 | 0 | 0 |
| 4/21/07 | 0 | 0 | 0 | 0 |
| 4/22/07 | 1 | 1 | 0 | 0 |
| 4/23/07 | 0 | 0 | 1 | 0 |
| 4/24/07 | 0 | 0 | 0 | 0 |
| 4/25/07 | 2 | 1 | 0 | 0 |
| 4/26/07 | 0 | 0 | 0 | 0 |
| 4/27/07 | 0 | 0 | 1 | 0 |
| 4/28/07 | 1 | 1 | 1 | 0 |
| 4/29/07 | 1 | 0 | 0 | 0 |
| 4/30/07 | 0 | 0 | 0 | 0 |

306

| Date for User 1 | Count1 | Count2 | Count3 | Count4 |
|---|---|---|---|---|
| 4/2/07 | 1 | 1 | 3 | 0 |
| 4/3/07 | 0 | 0 | 0 | 0 |
| 4/4/07 | 0 | 0 | 0 | 0 |
| 4/5/07 | 0 | 0 | 0 | 0 |
| 4/6/07 | 3 | 0 | 0 | 0 |
| 4/7/07 | 2 | 3 | 3 | 0 |
| 4/8/07 | 0 | 1 | 0 | 0 |
| 4/9/07 | 0 | 0 | 1 | 0 |
| 4/10/07 | 0 | 0 | 0 | 0 |
| 4/11/07 | 0 | 0 | 0 | 0 |
| 4/12/07 | 0 | 0 | 5 | 0 |
| 4/13/07 | 0 | 0 | 0 | 0 |
| 4/14/07 | 0 | 0 | 0 | 0 |
| 4/15/07 | 0 | 0 | 0 | 0 |
| 4/16/07 | 1 | 2 | 0 | 0 |
| 4/17/07 | 0 | 0 | 0 | 0 |
| 4/18/07 | 0 | 0 | 0 | 0 |
| 4/19/07 | 1 | 1 | 5 | 0 |
| 4/20/07 | 0 | 0 | 0 | 0 |
| 4/21/07 | 0 | 0 | 0 | 0 |
| 4/22/07 | 1 | 1 | 0 | 0 |
| 4/23/07 | 0 | 0 | 1 | 0 |
| 4/24/07 | 0 | 0 | 0 | 0 |
| 4/25/07 | 2 | 1 | 0 | 0 |
| 4/26/07 | 0 | 0 | 0 | 0 |
| 4/27/07 | 0 | 0 | 1 | 0 |
| 4/28/07 | 1 | 1 | 1 | 0 |
| 4/29/07 | 1 | 0 | 0 | 0 |
| 4/30/07 | 0 | 0 | 0 | 0 |
| 5/1/07 | 1 | 2 | 3 | 1 |

| Date for User 1 | Count1 | Count2 | Count3 | Count4 |
|---|---|---|---|---|
| 4/1/07 | 2 | 1 | 3 | 0 |
| 4/2/07 | 1 | 1 | 3 | 0 |
| 4/3/07 | 0 | 0 | 0 | 0 |
| 4/4/07 | 0 | 0 | 0 | 0 |
| 4/5/07 | 0 | 0 | 0 | 0 |
| 4/6/07 | 3 | 0 | 0 | 0 |
| 4/7/07 | 2 | 3 | 3 | 0 |
| 4/8/07 | 0 | 1 | 0 | 0 |
| 4/9/07 | 0 | 0 | 1 | 0 |
| 4/10/07 | 0 | 0 | 0 | 0 |
| 4/11/07 | 0 | 0 | 0 | 0 |
| 4/12/07 | 0 | 0 | 5 | 0 |
| 4/13/07 | 0 | 0 | 0 | 0 |
| 4/14/07 | 0 | 0 | 0 | 0 |
| 4/15/07 | 0 | 0 | 0 | 0 |
| 4/16/07 | 1 | 2 | 0 | 0 |
| 4/17/07 | 0 | 0 | 0 | 0 |
| 4/18/07 | 0 | 0 | 0 | 0 |
| 4/19/07 | 1 | 1 | 5 | 0 |
| 4/20/07 | 0 | 0 | 0 | 0 |
| 4/21/07 | 0 | 0 | 0 | 0 |
| 4/22/07 | 1 | 1 | 0 | 0 |
| 4/23/07 | 0 | 0 | 1 | 0 |
| 4/24/07 | 0 | 0 | 0 | 0 |
| 4/25/07 | 2 | 1 | 0 | 0 |
| 4/26/07 | 0 | 0 | 0 | 0 |
| 4/27/07 | 0 | 0 | 1 | 0 |
| 4/28/07 | 1 | 1 | 1 | 0 |
| 4/29/07 | 1 | 0 | 0 | 0 |
| 4/30/07 | 0 | 0 | 0 | 0 |

102

| | Count1 | Count2 | Count3 | Count4 |
|---|---|---|---|---|
| Aggregate for User1 | 15 | 12 | 23 | 0 |

| | Count1 | Count2 | Count3 | Count4 |
|---|---|---|---|---|
| Aggregate for User1 | 15 | 12 | 23 | 0 |

304

| | Count1 | Count2 | Count3 | Count4 |
|---|---|---|---|---|
| Aggregate for User1 | 12 | 13 | 23 | 1 |

302

| Date for User 1 | Count1 | Count2 | Count3 | Count4 |
|---|---|---|---|---|
| 4/1/07 | 2 | 1 | 3 | 0 |
| 4/2/07 | 1 | 1 | 3 | 0 |
| 4/3/07 | 0 | 0 | 0 | 0 |
| 4/4/07 | 0 | 0 | 0 | 0 |
| 4/5/07 | 0 | 0 | 0 | 0 |
| 4/6/07 | 3 | 0 | 0 | 0 |
| 4/7/07 | 2 | 3 | 3 | 0 |
| 4/8/07 | 0 | 1 | 0 | 0 |
| 4/9/07 | 0 | 0 | 1 | 0 |
| 4/10/07 | 0 | 0 | 0 | 0 |
| 4/11/07 | 0 | 0 | 0 | 0 |
| 4/12/07 | 0 | 0 | 5 | 0 |
| 4/13/07 | 0 | 0 | 0 | 0 |
| 4/14/07 | 0 | 0 | 0 | 0 |
| 4/15/07 | 0 | 0 | 0 | 0 |
| 4/16/07 | 1 | 2 | 0 | 0 |
| 4/17/07 | 0 | 0 | 0 | 0 |
| 4/18/07 | 0 | 0 | 0 | 0 |
| 4/19/07 | 1 | 1 | 5 | 0 |
| 4/20/07 | 0 | 0 | 0 | 0 |
| 4/21/07 | 0 | 0 | 0 | 0 |
| 4/22/07 | 1 | 1 | 0 | 0 |
| 4/23/07 | 0 | 0 | 1 | 0 |
| 4/24/07 | 0 | 0 | 0 | 0 |
| 4/25/07 | 2 | 1 | 0 | 0 |
| 4/26/07 | 0 | 0 | 0 | 0 |
| 4/27/07 | 0 | 0 | 1 | 0 |
| 4/28/07 | 1 | 1 | 1 | 0 |
| 4/29/07 | 1 | 0 | 0 | 0 |
| 4/30/07 | 0 | 0 | 0 | 0 |

306

| Date for User 1 | Count1 | Count2 | Count3 | Count4 |
|---|---|---|---|---|
| 4/2/07 | 1 | 1 | 3 | 0 |
| 4/3/07 | 0 | 0 | 0 | 0 |
| 4/4/07 | 0 | 0 | 0 | 0 |
| 4/5/07 | 0 | 0 | 0 | 0 |
| 4/6/07 | 3 | 0 | 0 | 0 |
| 4/7/07 | 2 | 3 | 3 | 0 |
| 4/8/07 | 0 | 1 | 0 | 0 |
| 4/9/07 | 0 | 0 | 1 | 0 |
| 4/10/07 | 0 | 0 | 0 | 0 |
| 4/11/07 | 0 | 0 | 0 | 0 |
| 4/12/07 | 0 | 0 | 5 | 0 |
| 4/13/07 | 0 | 0 | 0 | 0 |
| 4/14/07 | 0 | 0 | 0 | 0 |
| 4/15/07 | 0 | 0 | 0 | 0 |
| 4/16/07 | 1 | 2 | 0 | 0 |
| 4/17/07 | 0 | 0 | 0 | 0 |
| 4/18/07 | 0 | 0 | 0 | 0 |
| 4/19/07 | 1 | 1 | 5 | 0 |
| 4/20/07 | 0 | 0 | 0 | 0 |
| 4/21/07 | 0 | 0 | 0 | 0 |
| 4/22/07 | 1 | 1 | 0 | 0 |
| 4/23/07 | 0 | 0 | 1 | 0 |
| 4/24/07 | 0 | 0 | 0 | 0 |
| 4/25/07 | 2 | 1 | 0 | 0 |
| 4/26/07 | 0 | 0 | 0 | 0 |
| 4/27/07 | 0 | 0 | 1 | 0 |
| 4/28/07 | 1 | 1 | 1 | 0 |
| 4/29/07 | 1 | 0 | 0 | 0 |
| 4/30/07 | 0 | 0 | 0 | 0 |
| 5/1/07 | 1 | 2 | 3 | 1 |

FIG. 3

CONTEXT-SENSITIVE, SELF-ADJUSTING TARGETING MODELS

BACKGROUND OF THE INVENTION

1. Field of the Invention

The present invention relates to Internet traffic patterns. More particularly, the present invention relates to context-sensitive, self-adjusting models for targeting users based on traffic patterns.

2. Description of the Related Art

During typical Internet use, web users often utilize search engines or directories in order to find content relevant to what they would like to see. These search engines or directories often make money by placing advertising on the result pages of the users' searches, or otherwise profiting from the users' activity within the web pages operated by the search engine or directory. Hence, search engines and directories have a strong desire to steer users towards continuing to view web pages they operate even once the initial search has been completed.

SUMMARY OF THE INVENTION

In an embodiment, new traffic pattern data is received pertaining to a first time period having a first time increment. The traffic pattern data may be received as, or converted to, count information reflecting the probabilities that the user will select particular links services. An incremental table is accessed to determine stale traffic pattern count data, which is the traffic pattern count data in the incremental table over a second time period having the first time increment, wherein the second time period covers the oldest traffic pattern count data in the incremental table. Then a count table is updated to reflect removal of the stale traffic pattern count data, wherein the count table contains global count data at a higher level of granularity than the incremental table. The incremental table and count table are updated to reflect addition of the new traffic pattern data.

BRIEF DESCRIPTION OF THE DRAWINGS

FIG. 1 is a diagram illustrating an example of a count table and an incremental table in accordance with an embodiment of the present invention.

FIG. 3 is a diagram illustrating an example of an embodiment of the present invention.

DETAILED DESCRIPTION OF SPECIFIC EMBODIMENTS

Figure 2:
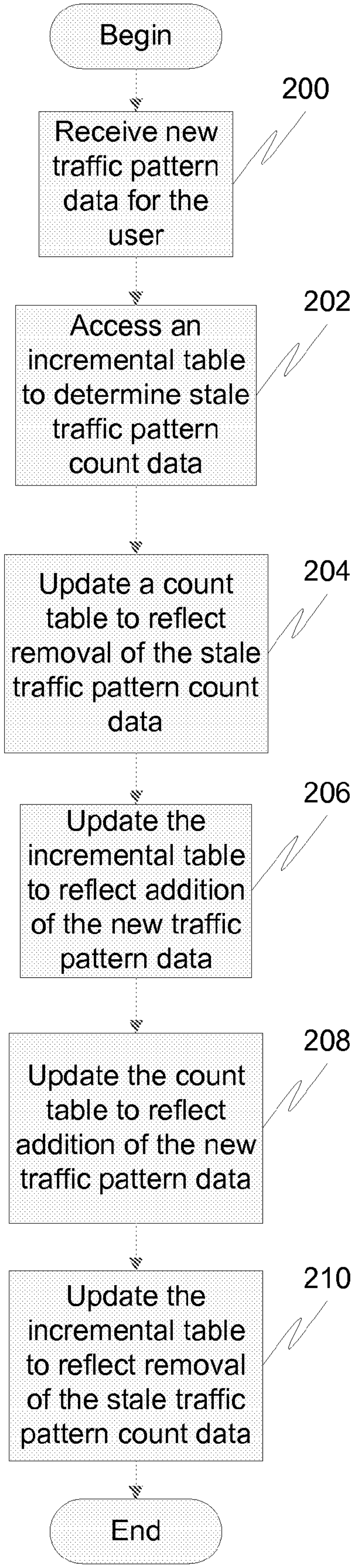
FIG. 2 is a flow diagram illustrating a method for automatically adjusting targeting of web users based upon user traffic pattern data in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well-known features may not have been described in detail to avoid unnecessarily obscuring the invention.

In an embodiment of the present invention, a search engine or directory recommends additional web pages or content within the control of the search engine or directory in response to user navigation. Depending on the context (e.g., currently viewed web page, prior web pages visited, links clicked upon, etc.), a user will exhibit different behavior and intentions. In order to leverage this context-sensitive user activity, a modeling process may be utilized. This modeling process is self-adjusting and adapts itself to a user's behavior. By doing so, the application is able to operate in real-time, with minimal computational cost.

This embodiment of the present invention may include three steps/components. The first allows for an input stream of modeling data. The second includes an incremental modeling process that includes the concept of a "time window." The third involves the detection of model evolution. Each of these steps/components will now be described in more detail.

Input modeling data may be fed into an infrastructure of the embodiment of the invention in a streaming fashion. Data may be retrieved on a periodic basis (e.g., daily) and stored locally. Necessary data extraction, transformation, and load steps may be performed on the raw data in order to transform it for use by the incremental modeling process. The data may be received as raw data and then transformed into "counts" through a modeling process The modeling process utilizes the actual data regarding paths that the user has followed during web sessions along with information regarding other users' web experiences. The modeling process may then derive "counts" for a user/link combination that indicates the probability that the user will click on the particular list. In a simple example, this probability may simply reflect the overall actual number of times the user (and users deemed "similar" to the user) clicked on the link with respect to the total number of times the users clicked on any link, however embodiments are foreseen using more sophisticated modeling techniques.

The incremental modeling process is called "incremental" because it can be re-trained in an amount of time that is linearly proportional with the size of the delta defined as newly added data plus expired data. Thus, the complexity of this process is on the order of that delta.

One possible implementation of this modeling process is a Naive Bayesian classifier that is extended to create a linearly incremental process. A Naive Bayesian classifier is a well known probability model that will not be described in more detail here. The embodiment using a naive Bayesian classifier is described in more detail later in this document.

In order to provide the "incremental" part of the modeling process, a "time window" is introduced. A time window is an interval that has a start date (and/or time) and an end date (and/or time). For example, a time window may start on 06/01/2006 and end on 09/01/2006. A "sliding time window" is a time window that has a fixed length, e.g. 30 days, but can slide along a timeline. In a typical case, a sliding time window moves forward one day each day, to reflect the advancement of time, and dynamically specifies a new range of time that may be used for the modeling process.

As the sliding time window changes, a linearly incremental algorithm may adjust (re-train) the model for the amount of time that is linear with the new data associated with the sliding time window, plus the data that is expired (moved out) from the previous sliding time window. For example, on a certain day the sliding time window of 30 days covers the entire period 9/1/2006 to 9/30/2006. On the next day, the sliding time window is moved forward one day to 9/2/2006 to 10/1/2006. The data of 10/1/2006, which can be referred to as D__10/1, is new to the sliding time window while the data of 0/1/2006, also known as D__9/1, may be expired by the sliding time window. A linearly incremental modeling process is able to retrain the model for 9/2/2006 to 10/1/2006 based on the existing model of 9/1/2006 to 9/30/2006 in an amount of time that is linear to (size(D__10/1)+size(D__9/1)).

In one embodiment of the present invention, a linear naive Bayesian process may be utilized. This process is based on conditional probability, where a user has a certain features vector. This vector may indicate certain characteristics or properties of the user. For example, a vector may indicate the user's gender, age, and a list of interests, such as (M, 25, retail/apparel, sports/basketball). Given a user with a certain feature vector, the process is able to calculate the probability that the user will click on a certain link or request another service.

The above probability may be computed by using the formula:

$$\text{Probability} = \frac{P(\overrightarrow{FV}|\text{click on link}) * P(\text{click on link})}{P(\overrightarrow{FV})}$$

Given a set of features (FV1, FV2, . . . , FVn) and a set of prediction classes (counts, such as C1, C2, . . . , Cn), a Naive Bayesian model may be uniquely specified by a list of counts where count_i is a Naive Bayesian parameter. In other words, the counts may represent the probabilities of the corresponding actions occurring for the corresponding time periods (e.g., the probability of the user clicking on a certain link using a certain day's data). It should be noted that these "counts" may be represented either as absolute counts (e.g., overall number of clicks), or as probabilities (percentages or ratios).

The global count is kept for the complete data set at execution time. This data is kept in a count table, although how the data is actually stored is irrelevant. For purposes of this document, therefore, the term "table" shall be understood to mean any data structure capable of storing the underlying data.

In order to make the naive Bayesian model linearly incremental, another copy of the count data may also be kept at the finest granularity by which the corresponding sliding window is moved. For example, if the sliding window is to be moved one day at a time, then the count data is kept at a granularity of a day (or even finer granularity). This data is kept in an incremental table. Thus, the incremental table may contain, for example, all of the counts for a particular feature vector for the past month, organized into days).

FIG. 1 is a diagram illustrating an example of a count table and an incremental table in accordance with an embodiment of the present invention. Here, the count table 100 represents the global counts for an entire month of data for a certain feature vector (FV). For the same FV, the incremental table contains counts broken down in the granularity at the day level. In this example, the counts represent the actual clicks that the user made on a particular link on the days displayed.

FIG. 2 is a flow diagram illustrating a method for automatically adjusting targeting of web users based upon user traffic pattern data in accordance with an embodiment of the present invention. At 200, new traffic pattern data is received for a user, the new traffic pattern data pertaining to a first time period having a first time increment. At 202, an incremental table is accessed to determine stale traffic pattern count data, wherein the stale traffic pattern count data is the traffic pattern count data in the incremental table over a second time period having the first time increment, wherein the second time period covers the oldest traffic pattern count data in the incremental table. At 204, a count table is updated to reflect removal of the stale traffic pattern count data, wherein the count table contains global count data at a higher level of granularity than the incremental table. At 206, the incremental table is updated to reflect addition of the new traffic pattern data. At 208, the count table is updated to reflect addition of the new traffic pattern data. At 210, the incremental table may be updated to reflect removal of the stale traffic pattern count data. It should be noted that this step is completely optional, as embodiments are foreseen wherein information is never or only rarely removed from the incremental table, allowing future access of the detailed granularity of these records.

Once the incremental modeling process has completed, the new model's evolution from the old model may be evaluated. This process determines how much the model of the new sliding time window is different from existing models based on earlier time periods. If the new model is different enough from the existing model (i.e., more than a certain threshold), then the new model may be used in determining targeting strategy for the user instead of the old model(s). This "model difference" is used as a factor in making this decision.

In one embodiment of the present invention, this model difference is the "click through rate lift ratio." "Lift" refers to the amount of predicted benefit provided by the new model over a baseline model (typically a model that simply serves links randomly). The click through lift ratio is defined as the ratio of click through lift provided by the old model divided by the click through lift provided by the new model. In other words, for the most recent user behavior data set (D) the existing model (M_old) performs a click-through rate (CTR) lift of X % over the random-serving CTR while the new model (M_new) performs a CTR lift of Y %. The CTR lift ratio (R) is then defined as R=Y/X. In another embodiment this model difference may be defined as the ratio of revenue lift of the new model divided by the revenue lift of the old model.

A replacement threshold (T_r), is the level over which the new model will replace the old model. The definition of what qualifies as a "model difference" is adjustable to fit different types of business requirements, such as revenue, user acquisition rate, user retention rate.

FIG. 3 is a diagram illustrating an example of an embodiment of the present invention. Here, a global count table 300 may be stored along with an incremental table 302. Both the global count table 300 and the incremental table 302 contain count information relating to the time period of 4/1/07 to 4/30/07. Suppose then on 5/1/07 additional traffic pattern data is received regarding the last days traffic. At this point, the incremental table 302 may be accessed to determine the stale traffic pattern data. Since the increment of the new traffic pattern data is one day, then the stale traffic pattern data will be the oldest traffic pattern count data in the incremental table over a one day period. Therefore in this case the oldest traffic pattern count data is the data from 4/1/07. The global count table 300 may therefore be updated to subtract out the data from 4/1/07, and also may be updated to add in the data from 5/1/07. This results in the global count table 304. The incremental table may then also be updated to add in the data from 5/1/07. As noted above, in an optional embodiment the data from 4/1/07 may be removed from the incremental table. Thus, in such an optional embodiment, the new incremental table will appear as incremental table 306.

Figure 4:
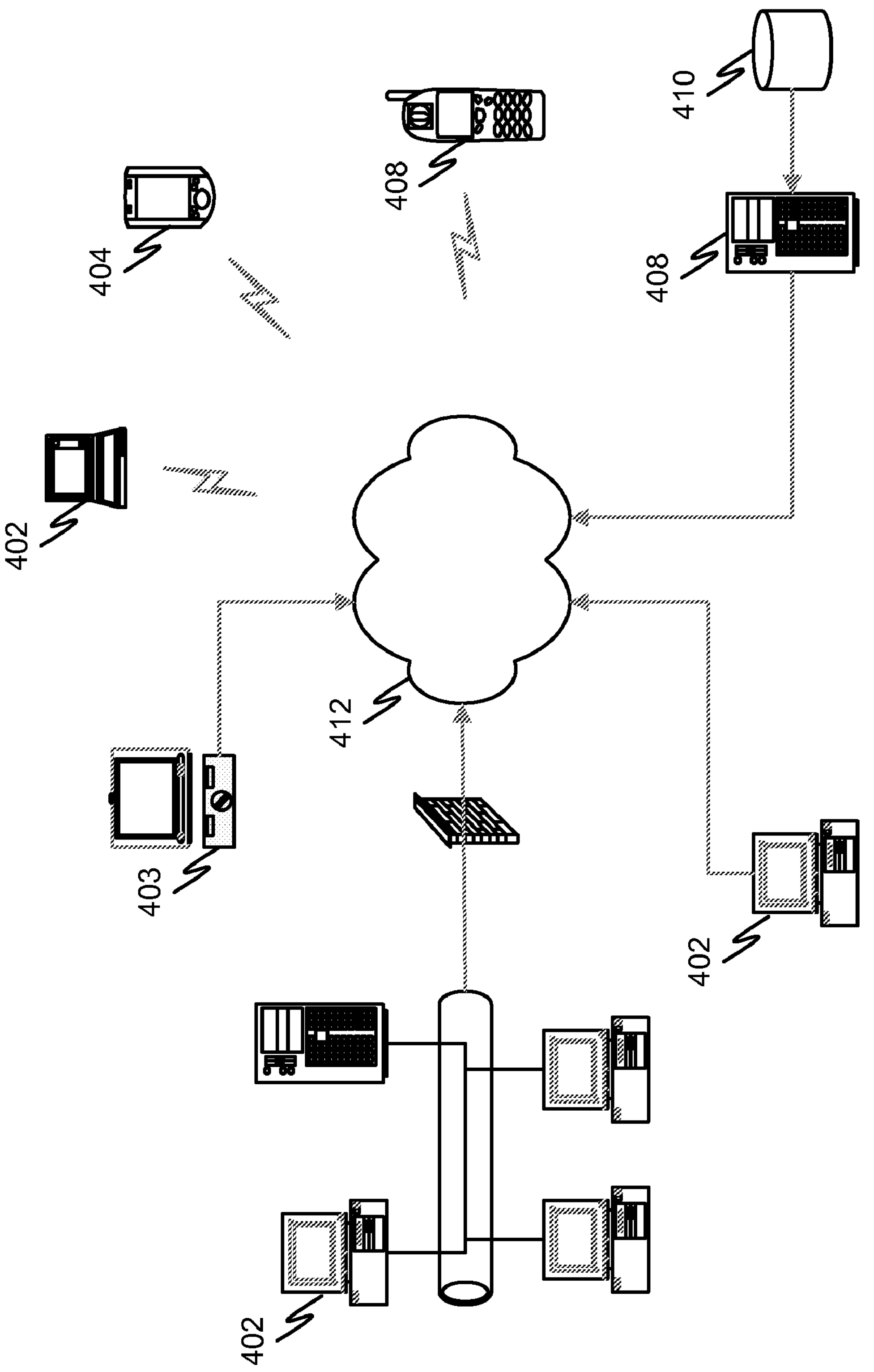
FIG. 4 is an exemplary network diagram illustrating some of the platforms which may be employed with various embodiments of the invention.

It should also be noted that the present invention may be implemented on any computing platform and in any network topology in which analysis of path information is a useful functionality. For example and as illustrated in FIG. 4, implementations are contemplated in which the user traffic pattern information is collected in a network containing personal computers 402, media computing platforms 403 (e.g., cable and satellite set top boxes with navigation and recording capabilities (e.g., Tivo)), handheld computing devices (e.g., PDAs) 404, cell phones 406, or any other type of portable communication platform. Users of these devices may navigate the network, and traffic information may be collected by server 408. Server 408 may include a memory and a processor and may then utilize the various techniques described above to manipulate and analyze traffic information in an efficient manner, storing the tables in the memory and using the processor to execute the various steps described above. Applications may be resident on such devices, e.g., as part of a browser or other application, or be served up from a remote site, e.g., in a Web page, (represented by server 408 and data store 410). The invention may also be practiced in a wide variety of network environments (represented by network 412), e.g., TCP/IP-based networks, telecommunications networks, wireless networks, etc. The invention may also be tangibly embodied in a program storage device as a series of instructions readable by a computer (i.e., in a computer readable medium).

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for automatically adjusting targeting of web users based upon user web traffic pattern data, the method comprising:

executing computer program instructions for, at a first time, generating, using a processor, a first data model for web traffic pattern data using an incremental modeling process, wherein an incremental modeling process is a modeling process that can be re-trained in an amount of time that is linearly proportional with the size of a delta defined as newly added data plus expired data, wherein the generating includes generating a series of counts for combinations between individual users and particular web addresses, wherein the counts represent the probability that the individual user will navigate a web browser to the corresponding particular web address, and wherein the incremental modeling process bases the probabilities on the user web traffic pattern data over a fixed length of time, resulting in a count table containing the counts organized by total counts per user and web address combination over the entire fixed length of time and an incremental table containing total counts per user and web address combination over incremental periods of time smaller in length than the fixed length of time, wherein the incremental modeling process is a Naive Bayesian classifier modeling process and includes:

receiving as input a feature vector for a user, wherein the feature vector indicates characteristics of the user; and calculating the probability that the user will request a particular web page or service based upon the feature vector and based upon the feature vector;

executing computer program instructions for recommending, using the processor, a web page or content of interest to a user by using the first data model;

executing computer program instructions for, at a second time later than the first time, generating, using the processor, a second data model for web traffic pattern data by retraining the first data model using the incremental modeling process, wherein the retraining includes basing new counts for combinations between individual users and particular web addresses on web traffic pattern data received between the first time and the second time and on web traffic pattern data in the incremental table, while ignoring web traffic pattern data in the incremental table representing the oldest web traffic pattern data in the incremental table over a length of time equal to the length of time between the first time and the second time;

executing computer program instructions for updating, using the processor, the count table and incremental table based upon the retraining;

deriving, using the processor, a model difference between the first data model and the second data model; and if the model difference is greater than a set threshold, recommending, using the processor, a web page or content of interest to a user by using the second data model.

2. The computer-implemented method of claim 1, further comprising:

executing computer program instructions for tracking web traffic pattern data by monitoring and recording user navigation of a web browser.

3. The computer-implemented method of claim 1, wherein the model difference is a ratio of click-through lift provided by the first data model divided by click-through lift provided by the second data model.

4. The computer-implemented method of claim 1, wherein the model difference is a ratio of revenue lift provided by the first data model divided by revenue lift provided by the second data model.

5. The computer-implemented method of claim 1, wherein the incremental periods in the incremental table are days, resulting in an incremental table that organizes counts by days.

6. The computer-implemented method of claim 5, wherein the updating includes removing the user web traffic pattern data from the oldest day's data in the incremental and count tables.

7. The computer-implemented method of claim 1, wherein the incremental period contains only user web traffic pattern data for a period of time within a window of fixed duration.

8. A computer server for automatically adjusting targeting of web users based upon user web traffic pattern data, the computer server comprising:

a memory; and a processor configured to:

at a first time, generate, using a processor, a first data model for web traffic pattern data using an incremental modeling process, wherein an incremental modeling process is a modeling process that can be retrained in an amount of time that is linearly proportional with the size of a delta defined as newly added data plus expired data, wherein the generating includes generating a series of counts for combinations between individual users and particular web addresses, wherein the counts represent the probability that the individual user will navigate a web browser to the corresponding particular web address, and wherein the incremental modeling process bases the probabilities on the user web traffic pattern data over a fixed length of time, resulting in a count table containing the counts organized by total counts per user and web address combination over the entire fixed length of time and an incremental table containing total counts per user and web address combination over incremental periods of time smaller in length than the fixed length of time wherein the incremental modeling process is a Naive Bayesian classifier modeling process and includes:

receiving as input a feature vector for a user, wherein the feature vector indicates characteristics of the user; and calculating the probability that the user will request a particular web cage or service based upon the feature vector and based upon the feature vector;

recommend, using the processor, a web page or content of interest to a user by using the first data model;

at a second time later than the first time, generate, using the processor, a second data model for web traffic pattern data by retraining the first data model using the incremental modeling process, wherein the retraining includes basing new counts for combinations between individual users and particular web addresses on web traffic pattern data received between the first time and the second time and on web traffic pattern data in the incremental table, while ignoring web traffic pattern data in the incremental table representing the oldest web traffic pattern data in the incremental table over a length of time equal to the length of time between the first time and the second time;

update, using the processor, the count table and incremental table based upon the retraining;

derive, using the processor, a model difference between the first data model and the second data model; and if the model difference is greater than a set threshold, recommend, using the processor, a web page or content of interest to a user by using the second data model.

9. The computer server of claim 8, wherein the processor is further configured to:

track web traffic pattern data by monitoring and recording user navigation of a web browser.

10. The computer server of claim 8, wherein the model difference is a ratio of click-through lift provided by the first data model divided by click-through lift provided by the second data model.

11. The computer server of claim 8, wherein the model difference is a ratio of revenue lift provided by the first data model divided by revenue lift provided by the second data model.

12. The computer server of claim 8, wherein the incremental periods in the incremental table are days, resulting in an incremental table that organizes counts by days.

13. The computer server of claim 12, wherein the updating includes removing the user web traffic pattern data from the oldest day's data in the incremental and count tables.

14. The computer server of claim 8, wherein the incremental period contains only user web traffic pattern data for a period of time within a window of fixed duration.

15. An apparatus for automatically adjusting targeting of web users based upon user web traffic pattern data, the method comprising:

means for, at a first time, generating, using a processor, a first data model for web traffic pattern data using an incremental modeling process, wherein an incremental modeling process is a modeling process that can be re-trained in an amount of time that is linearly proportional with the size of a delta defined as newly added data plus expired data, wherein the generating includes generating a series of counts for combinations between individual users and particular web addresses, wherein the counts represent the probability that the individual user will navigate a web browser to the corresponding particular web address, and wherein the incremental modeling process bases the probabilities on the user web traffic pattern data over a fixed length of time, resulting in a count table containing the counts organized by total counts per user and web address combination over the entire fixed length of time and an incremental table containing total counts per user and web address combination over incremental periods of time smaller in length than the fixed length of time, wherein the incremental modeling process is a Naive Bayesian classifier modeling process and includes:

receiving as input a feature vector for a user, wherein the feature vector indicates characteristics of the user; and calculating the probability that the user will request a particular web page or service based upon the feature vector and based upon the feature vector;

means for recommending, using the processor, a web page or content of interest to a user by using the first data model;

means for, at a second time later than the first time, generating, using the processor, a second data model for web traffic pattern data by retraining the first data model using the incremental modeling process, wherein the retraining includes basing new counts for combinations between individual users and particular web addresses on web traffic pattern data received between the first time and the second time and on web traffic pattern data in the incremental table, while ignoring web traffic pattern data in the incremental table representing the oldest web traffic pattern data in the incremental table over a length of time equal to the length of time between the first time and the second time;

means for updating, using the processor, the count table and incremental table based upon the retraining;

means for deriving, using the processor, a model difference between the first data model and the second data model; and means for, if the model difference is greater than a set threshold, recommending, using the processor, a web page or content of interest to a user by using the second data model.

16. The apparatus of claim 15, further comprising:

means for tracking web traffic pattern data by monitoring and recording user navigation of a web browser.

17. The apparatus of claim 15, wherein the model difference is a ratio of click-through lift provided by the first data model divided by click-through lift provided by the second data model.

18. The apparatus of claim 15, wherein the model difference is a ratio of revenue lift provided by the first data model divided by revenue lift provided by the second data model.

* * * * *